United States Patent
Schneider

(10) Patent No.: US 8,967,869 B2
(45) Date of Patent: Mar. 3, 2015

(54) COMPONENT WITH A SLIDING SURFACE FOR BEARING ANOTHER COMPONENT, AND METHOD FOR PRODUCING A SLIDING LAYER

(75) Inventor: Manuela Schneider, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/699,677

(22) PCT Filed: May 18, 2011

(86) PCT No.: PCT/EP2011/058028
§ 371 (c)(1),
(2), (4) Date: Nov. 23, 2012

(87) PCT Pub. No.: WO2011/147722
PCT Pub. Date: Dec. 1, 2011

(65) Prior Publication Data
US 2013/0065801 A1    Mar. 14, 2013

(30) Foreign Application Priority Data

May 25, 2010    (DE) .......................... 10 2010 022 039

(51) Int. Cl.
*F16C 33/10*    (2006.01)
*F16C 33/12*    (2006.01)
(Continued)

(52) U.S. Cl.
CPC .............. *F16N 99/00* (2013.01); *F16C 33/208* (2013.01); *F16C 33/108* (2013.01); *F16C 33/103* (2013.01); *F16C 33/14* (2013.01); *Y10S 384/907* (2013.01)
USPC ........... 384/286; 384/129; 384/279; 384/293; 384/296; 384/907; 508/103

(58) Field of Classification Search
CPC ................. F16C 33/14; F16C 33/103–33/104; F16C 33/208
USPC ......... 384/129, 276, 279, 280, 285–286, 293, 384/322, 907; 508/103, 110; 428/354, 564, 428/697, 699
See application file for complete search history.

(56) References Cited

U.S. PATENT DOCUMENTS 3,540,862 A * 11/1970 Roemer ........................ 428/697
3,779,918 A    12/1973 Ikeda et al.
(Continued)

FOREIGN PATENT DOCUMENTS

CN            763236 A    4/2006
CN        101101023 A    1/2008
(Continued)

OTHER PUBLICATIONS

International Search Report for PCT/EP2011/058028; mailed Aug. 29, 2011.
(Continued)

*Primary Examiner* — Marcus Charles
(74) *Attorney, Agent, or Firm* — Staas & Halsey LLP

(57) ABSTRACT

Particles, embedded into a sliding layer, have a coating, within which a lubricant, e.g., a liquid, is contained. A component with the sliding layer provides a sliding surface that can be used as a backup bearing to ensure emergency operating properties, for example, of a shaft that is mounted in a main bearing. When the shaft strikes the bearing surface, the coating of the particles that are exposed on the bearing surface are destroyed and the lubricant can exit. Advantageously, the sliding properties of the sliding surface are thereby improved.

10 Claims, 1 Drawing Sheet

(51) Int. Cl.
*F16N 99/00* (2006.01)
*F16C 33/20* (2006.01)
*F16C 33/14* (2006.01)

(56) References Cited

U.S. PATENT DOCUMENTS

| | | | |
|---|---|---|---|
| 3,950,047 A | | 4/1976 | Capelli |
| 3,990,860 A | * | 11/1976 | Fletcher et al. ............... 428/564 |
| 4,056,478 A | * | 11/1977 | Capelli ........................ 384/203 |
| 5,045,405 A | * | 9/1991 | Koroschetz et al. ........... 428/612 |
| 5,482,637 A | * | 1/1996 | Rao et al. ...................... 508/100 |
| 5,648,620 A | | 7/1997 | Stenzel et al. |
| 5,702,769 A | | 12/1997 | Peters |
| 6,464,396 B1 | * | 10/2002 | Schubert et al. ............. 384/297 |
| 7,067,203 B2 | * | 6/2006 | Joelsson et al. .............. 428/697 |
| 7,101,087 B2 | * | 9/2006 | Hiramatsu et al. ............ 384/279 |
| 7,249,890 B2 | * | 7/2007 | Bickle et al. .................. 384/279 |
| 8,007,178 B2 | * | 8/2011 | Perrin et al. .................. 384/276 |
| 2003/0180565 A1 | * | 9/2003 | Herbst-Dederichs ......... 428/553 |
| 2006/0292398 A1 | | 12/2006 | Vigneau et al. |
| 2007/0242910 A1 | * | 10/2007 | Akita et al. ................... 384/279 |
| 2009/0154990 A1 | * | 6/2009 | Julliere ........................ 403/141 |
| 2010/0183254 A1 | * | 7/2010 | Jensen et al. ................. 384/279 |

FOREIGN PATENT DOCUMENTS

| | | | | |
|---|---|---|---|---|
| DE | 1 922 756 | | 12/1969 | |
| DE | 1 644 927 | | 5/1971 | |
| DE | 24 47 389 | | 10/1975 | |
| DE | 40 38 139 A1 | | 6/1992 | |
| DE | 44 06 191 A1 | | 9/1995 | |
| DE | 102008046817 A1 | * | 4/2010 | .............. F16C 33/12 |
| EP | 0 725 158 A1 | | 2/1995 | |
| JP | 55042837 A | * | 3/1980 | .............. F16C 33/20 |
| JP | 05320681 A | * | 12/1993 | ........... C10M 169/04 |
| WO | WO 2009116621 A1 | * | 9/2009 | .............. F16C 33/12 |

OTHER PUBLICATIONS

German Report of Examination mailed Dec. 10, 2010, issued in corresponding German Patent Application No. 10 2010 022 039.6.
Office Action dated Aug. 29, 2014 issued in corresponding Chinese Patent Application No. 201180036568.3.

* cited by examiner

COMPONENT WITH A SLIDING SURFACE FOR BEARING ANOTHER COMPONENT, AND METHOD FOR PRODUCING A SLIDING LAYER

CROSS REFERENCE TO RELATED APPLICATIONS

This application is the U.S. national stage of International Application No. PCT/EP2011/058028, filed May 18, 2011 and claims the benefit thereof. The International Application claims the benefits of German Application No. 102010022039.6 filed on May 25, 2010, both applications are incorporated by reference herein in their entirety.

BACKGROUND

Described below is a component with a sliding surface, which is intended for the sliding bearing of another component, the sliding surface being formed by a sliding layer. Also described is a method for producing a sliding layer with a sliding surface on a component.

A component with a sliding surface of the type mentioned at the beginning is described for example in DE 40 38 139 A1. In that case it is a composite sliding bearing which has a bearing layer of an aluminum alloy. A solid lubricant that improves the sliding properties of this bearing layer of the aluminum alloy can be introduced into the open pores of the aluminum alloy layer.

DE 44 06 191 A1 describes a sliding bearing which, for guiding a component to be mounted, has a molding, such as for example a sliding bush for a cylinder running surface. This molding is of an open-pore configuration, it being possible for a soft substance such as graphite or molybdenum sulfide, combined with relatively hard substances, to be introduced into the open pores to achieve certain emergency running properties.

Included among the applications for sliding bearings are that they are used as backup bearings in the event of failure of a main bearing which, under normal conditions, ensures low-friction operation. Such backup bearings consequently ensure emergency running properties of a mounted shaft, for example in the case of an electrical machine.

SUMMARY

An aspect is to produce a component with a sliding surface of the type mentioned at the beginning and a method for producing a sliding surface that provides such a sliding surface, with which a sliding surface that improves the emergency running properties for a bearing can be produced.

The component mentioned at the beginning has a sliding layer formed of a metal alloy with a metallic matrix and with a structural phase distributed in the matrix and including a lubricant surrounded by a closed coating, the structural phase forming a constituent part of the sliding surface. All known typical sliding bearing materials come into consideration as metals for the sliding layer, for example brass, copper, nickel or bronze. The structural phase that provides the lubricant is distributed in the sliding layer, this structural phase being exposed at the sliding surface. If the sliding surface is used as a backup bearing, the coatings of the structural phase are advantageously destroyed by the mounted component, so that the lubricant enclosed in the coating is released. This allows the sliding behavior of the sliding surface to be improved significantly, the coating of the particles preventing the lubricant from being lost during the sometimes considerable period of time in which the backup bearing does not come into use.

According to a refinement, the lubricant may be a liquid such as oil. Specifically in the case of liquid lubricants, the risk with a backup bearing of the lubricant disappearing from the sliding surface (for example drying out, being washed out or evaporating) is particularly great. For this reason, the use of liquid lubricants may benefit in particular from the structural phase that is formed by the liquid lubricant being surrounded by a coating, i.e. encapsulated.

According to another refinement, the lubricant may be a solid, such as molybdenum sulfide, tungsten sulfide or graphite. When these lubricants are used, the coating can advantageously bring about the effect that these solid lubricants are only broken down when the backup bearing comes into use and the coatings are broken open. Here, too, a chemical change in the dry lubricants can be prevented by the coating until the backup bearing is used.

According to another refinement, the coating may be a plastic. Plastics which themselves bring about good lubricating properties and can in this way contribute to the lubrication of the sliding surface are particularly suitable here. This is the case for example with Teflon. Alternatively, a wax may also be used. However, a precondition is that the coating formed by the plastic is at the same time not attacked or dissolved by the encapsulated lubricant. With regard to this question, Teflon for example has advantages.

According to another refinement, the coating may be a metal. This has the advantage that, for example in the case of electrochemical coating processes, the lubricant with its metallic encapsulation can be incorporated in the electrochemically formed sliding layer by the coated lubricant particles being dispersed in the electrolytic deposition process. The metallic surface of the dispersed particles advantageously allows incorporation of these particles with a high degree of filling in the electrochemically produced layer that is forming. This can also be ensured by a metallized plastic coating. The plastic coating should be very thin and, when subjected to loading, burst open and release the lubricant. In the case of a purely metallic coating, greater forces are required for bursting open, so that coatings for various applications are available.

It is particularly advantageous if the structural phase that provides the lubricant respectively has expansions of less than one micrometer. This ensures that the structural phase only impairs the mechanical stability of the sliding layer to a small extent, which is of great significance for the mechanical behavior of the sliding layer in the event of use.

According to another refinement, the component may be formed as a backup bearing for the component to be mounted. In the application as a backup bearing, the effect described above of improving the emergency running properties of the bearing can advantageously be used particularly effectively.

In a method for producing a sliding layer with a sliding surface on a component, the sliding layer is produced by electrochemical or chemical deposition of a metal or metal alloy, particles of a lubricant surrounded by a coating being incorporated during the deposition in the sliding layer that is forming, in such a way that the particles form a constituent part of the sliding surface. In this case, the structural phase is formed of incorporated particles which themselves are coated. All lubricants (solid and liquid) can be advantageously used almost without restriction, since the coating ensures in any event that the particles are incorporated in the electrochemically produced layer that is forming. Mineral oils, graphite, molybdenum disulfide or tungsten disulfide come into consideration for example as lubricants.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
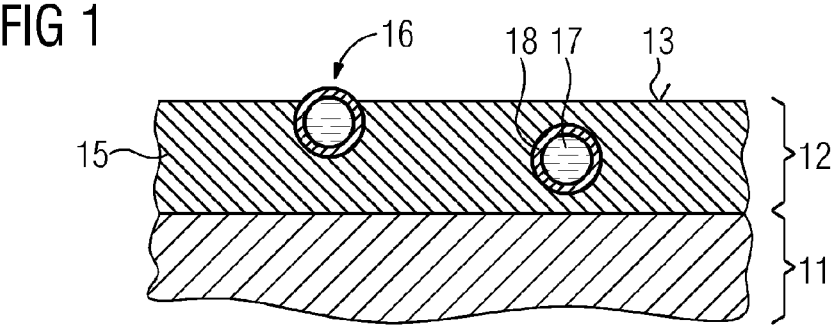
FIGS. 1 and 2 are each a schematic partial section of an exemplary embodiment of the component with a sliding surface that is used as a backup bearing and FIG. 3 is a section view of an exemplary embodiment of the method in use.

Reference will now be made in detail to the preferred embodiments, examples of which are illustrated in the accompanying drawings, wherein like reference numerals refer to like elements throughout.

A backup bearing according to FIG. 1 is schematically represented as a detail of a section. This section may, for example, extend longitudinally through a coated bearing shell (not represented any more specifically). A component 11 is represented only as a detail and could be formed by a bearing shell. In this bearing shell there is formed a sliding layer 12, which provides a sliding surface 13. This sliding surface is intended for bearing another component 14 (cf. FIG. 2). The other component 14 could be for example a shaft. This is not represented in FIG. 1, because it is a backup bearing with emergency running properties, which does not come into use in the usual operation of the shaft (not represented) of a machine.

The sliding layer 12 has a metallic matrix 15, in which particles 16 are incorporated. These particles have a liquid lubricant 17 inside, which is surrounded by a coating 18, in order that the lubricant 17 can be reliably stored. It can also be seen that the particles 16 are partially exposed in the sliding surface 13, so that the coating 18 of the particles 16 is exposed to direct attack by the component 14.

Figure 2:
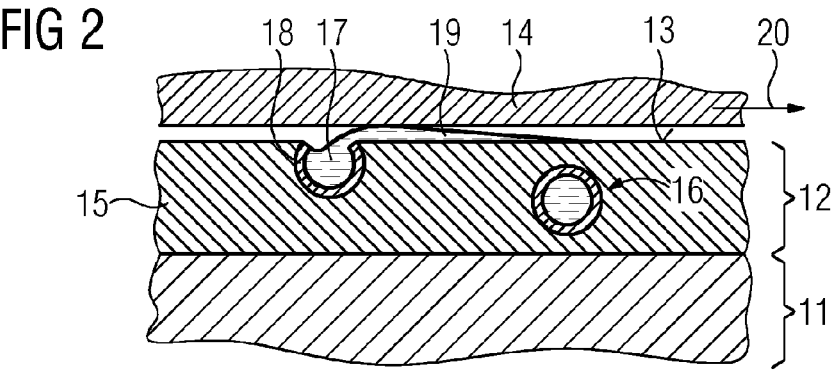

This is the case when the backup bearing comes into use to ensure emergency running properties of the component 14 (shaft), as is represented in FIG. 2. The coating 18 of the particles 16 (only one of which is represented) that is exposed at the surface is broken open by the component 14, so that the lubricant 17 located in the destroyed coating 18 empties out and forms a lubricating film 19, which spreads out in the direction 20 of the movement of the component 14. The sliding properties of the sliding surface 13 are thereby improved.

Figure 3:
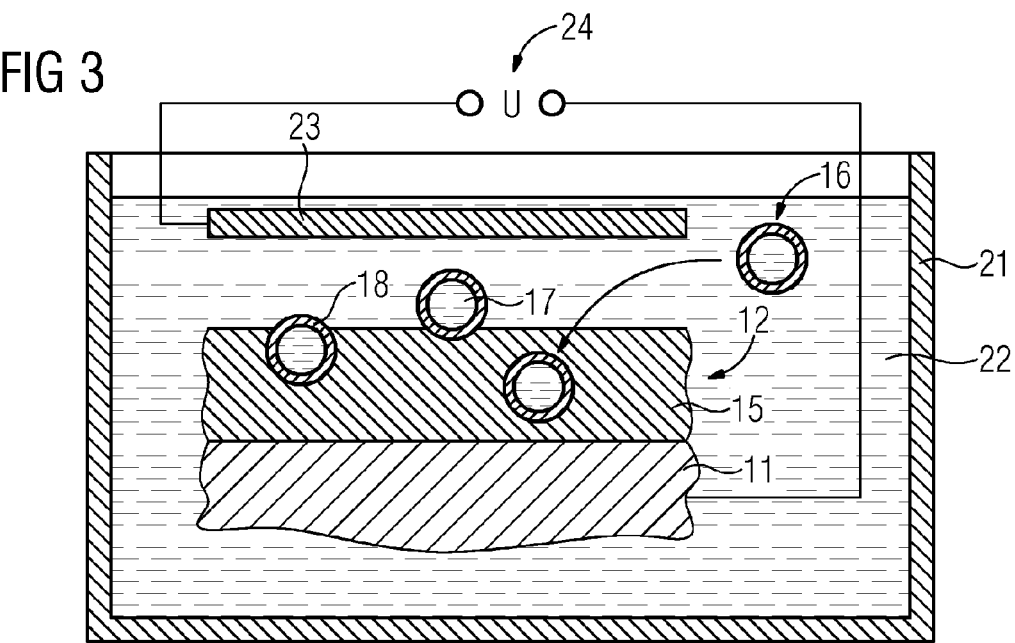

In FIG. 3, a method by which the component 11 can be coated with a sliding layer 12 is represented. This takes place by a galvanic process, a container 21 with an electrolyte 22 being provided and the component 11 being immersed therein. This forms the working electrode, with a counterelectrode 23 also being provided and the two electrodes being connected to a voltage source 24. By applying the voltage, a sliding layer 12 is deposited on the component 11. Since the particles 16 are also dispersed in the electrolyte 22, during the buildup of the sliding layer 12 they are incorporated in the matrix 15 that is forming. This produces a component 11 with a sliding layer 12 according to FIG. 1.

The following electrolytes may be used with corresponding detergents, once the coated particles of a lubricant have been dispersed in them by stirring with a magnetic or paddle stirrer for 1 to 6 hours.

Copper:
50-65 g/l of Cu as CuCN
30-35 g/l of KCN
15-20 g/l of KOH
at 50° C. electrolyte temperature
and 2 A/dm2 depositing current density Chemical Nickel:
30 g/l of nickel sulfate
10 g/l of sodium hypophosphite
12 g/l of sodium citrate
5 g/l of sodium acetate
0.1 g/l of thiourea
at 85° C. electrolyte temperature A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A component with a sliding surface providing a sliding bearing of another component, comprising:
   a sliding layer formed of a metal alloy with a metallic matrix having a structural phase distributed in the matrix, the structural phase which is partially exposed in the sliding surface including a liquid lubricant oil surrounded by a closed coating.

2. The component as claimed in claim 1, wherein the coating is one of a plastic and a wax.

3. The component as claimed in claim 1, wherein the coating is a metal.

4. The component as claimed in claim 1, wherein the structural phase has expansions of less than 1 μm.

5. The component as claimed in claim 1, wherein the component is formed as a backup bearing for the other component.

6. A component with a sliding surface providing a sliding bearing of another component, comprising:
   a sliding layer formed of a metal alloy with a metallic matrix having a structural phase distributed in the matrix, the structural phase which is partially exposed in the sliding surface including a solid lubricant selected from the group consisting of molybdenum sulfide, tungsten sulfide and graphite.

7. The component as claimed in claim 6, wherein the coating is one of a plastic and a wax.

8. The component as claimed in claim 6, wherein the coating is a metal.

9. The component as claimed in claim 6, wherein the structural phase has expansions of less than 1 μm.

10. The component as claimed in claim 6, wherein the component is formed as a backup bearing for the other component.

* * * * *